US008131544B2

(12) United States Patent
Herbig et al.

(10) Patent No.: US 8,131,544 B2
(45) Date of Patent: Mar. 6, 2012

(54) SYSTEM FOR DISTINGUISHING DESIRED AUDIO SIGNALS FROM NOISE

(75) Inventors: Tobias Herbig, Ulm (DE); Oliver Gaupp, Unterstadion (DE); Franz Gerl, Neu-Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 648 days.

(21) Appl. No.: 12/269,837

(22) Filed: Nov. 12, 2008

(65) Prior Publication Data

US 2009/0228272 A1 Sep. 10, 2009

(30) Foreign Application Priority Data

Nov. 12, 2007 (EP) .................................... 07021933

(51) Int. Cl.
*G10L 15/20* (2006.01)

(52) U.S. Cl. ........ 704/233; 704/221; 704/226; 704/206; 704/236; 704/255

(58) Field of Classification Search .................. 704/233, 704/211, 226, 206, 236, 255
See application file for complete search history.

(56) References Cited

U.S. PATENT DOCUMENTS 5,353,376 A * 10/1994 Oh et al. ........................ 704/233
6,615,170 B1 * 9/2003 Liu et al. ........................ 704/233
2002/0165713 A1 11/2002 Skoglund et al.
2003/0191636 A1 * 10/2003 Zhou ............................ 704/226
2006/0122832 A1 * 6/2006 Takiguchi et al. ............ 704/240
2007/0239441 A1 * 10/2007 Navratil et al. ............... 704/225
2008/0046241 A1 * 2/2008 Osburn et al. ................. 704/250
2009/0119103 A1 5/2009 Gerl
2011/0040561 A1 * 2/2011 Vair et al. ...................... 704/240

FOREIGN PATENT DOCUMENTS

JP 2007093630 12/2007
WO WO 2008/082793 A2 7/2008

OTHER PUBLICATIONS

PCT Search Report for Application No. EP 07 02 1933 dated Feb. 11, 2008.
S. Wrigley, G. Brown, V. Wan, and S. Renals, *Speech and Crosstalk Detection in Multichannel Audio*, IEEE Transactions on Speech and Audio Processing, vol. 13, No. 1, Jan. 2005, pp. 84-91.
D. Reynolds, T. Quatieri, and R. Dunn, *Speaker Verification Using Adapted Gaussian Mixture Models*, Digital Signal Processing 10, 19-41 (2000), pp. 20-41.
Communication Pursuant to Article 94(3) EPC; Application No. 07 021 933.2-2225; Oct. 26, 2009.

* cited by examiner

*Primary Examiner* — Qi Han
(74) *Attorney, Agent, or Firm* — Sunstein Kann Murphy & Timbers LLP

(57) ABSTRACT

A system distinguishes a primary audio source and background noise to improve the quality of an audio signal. A speech signal from a microphone may be improved by identifying and dampening background noise to enhance speech. Stochastic models may be used to model speech and to model background noise. The models may determine which portions of the signal are speech and which portions are noise. The distinction may be used to improve the signal's quality, and for speaker identification or verification.

21 Claims, 4 Drawing Sheets

SYSTEM FOR DISTINGUISHING DESIRED AUDIO SIGNALS FROM NOISE

PRIORITY CLAIM

This application claims the benefit of priority from European Patent Application No. 07021933.2, filed Nov. 12, 2007, which is incorporated by reference.

BACKGROUND OF THE INVENTION

1. Technical Field

This disclosure is related to a speech processing system that distinguishes background noise from a primary audio source for speech recognition and speaker identification/verification in noisy environments.

2. Related Art

Speech recognition may confirm or reject speaker identities. When recognizing speech, the audio that includes the speech is processed to identify high-quality speech signals, rather than background noise. Speech signals detected by microphones may be distorted by background noise that may or may not include speech signals of other speakers. Some systems may not distinguish sound from a primary source, such as a foreground speaker, from background noise.

SUMMARY

A system distinguishes a primary audio source, such as a speaker, from background noise to improve the quality of an audio signal. A speech signal from a microphone may be improved by identifying and dampening background noise to enhance speech. Stochastic models may be used to model speech and to model background noise. The models may determine which portions of the signal are speech and which portions are noise. The distinction may be used to improve the signal's quality, and for speaker identification or verification.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Speech recognition and speaker identification/verification may utilize segmentation of detected verbal utterances to discriminate or distinguish between speech and non speech (e.g., significant speech pause segments). The temporal evolution of microphone signals comprising both speech and speech pauses may be analyzed. For example, the energy evolution in the time or frequency domain of the signal may be analyzed. Abrupt energy drops may indicate significant speech pauses. However, background noise or perturbations with energy levels that are comparable to the ones of the speech contribution to the microphone signal may be recognized in the signal as speech, which may result in a deterioration of the microphone signal. Utilizing the pitch and/or other associated harmonics may also be used for identifying speech passages and distinguishing background noise that may have a high-energy level. However, perturbations that include both non-verbal and verbal noise/perturbations (also known as "babble noise") may not be detected. For example, those perturbations may be relatively common in the context of conference settings, meetings and product presentations, e.g., in trade shows. The use of stochastic models for the primary audio source, such as the speaker, and stochastic models the secondary audio, such as any background noise, may distinguish the desirable audio from the audio signal. The stochastic models may be combined with energy and/or pitch analysis for speech recognition, or speaker identification and verification.

Figure 1:
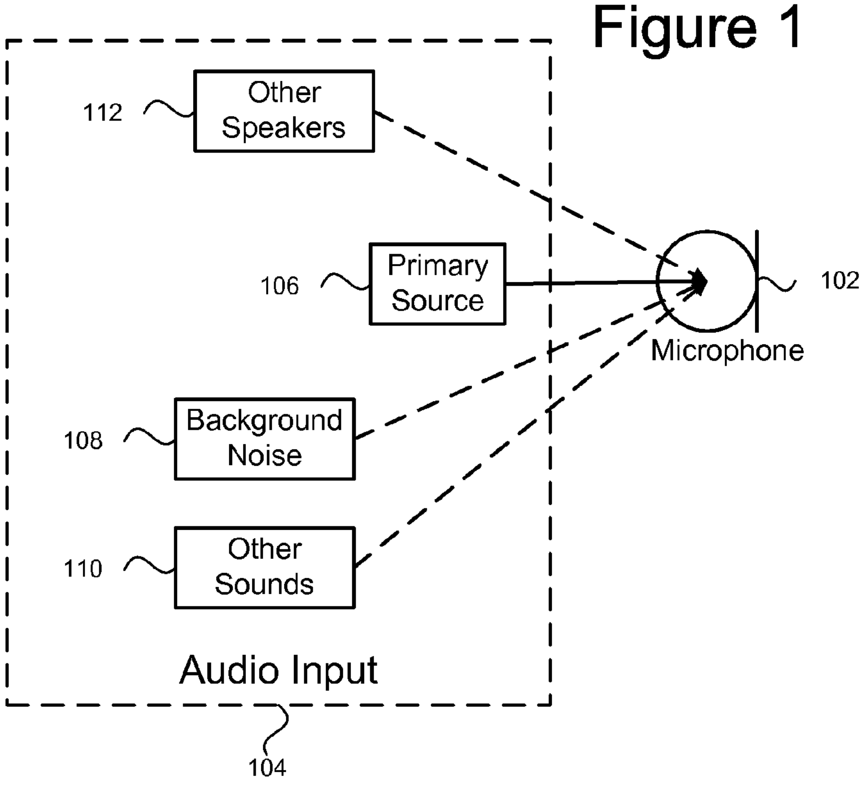
FIG. 1 is a recording environment.

FIG. 1 is a recording environment in which a microphone 102 may receive an audio input signal 104. The microphone 102 may be any device or instrument for receiving or measuring sound. The microphone 102 may be a transducer or sensor that converts sound/audio into an operating signal that is representative of the sound/audio at the microphone. The microphone 102 receives the audio input signal 104. The audio input signal 104 may include any acoustic signals or vibrations that may be detected when the signal lie in an aural range. The audio input signal 104 may be characterized by wave properties, such as frequency, wavelength, period, amplitude, speed, and direction. These sound signals may be detected by the microphone 102 or an electrical or optical transducer. The audio input signal 104 may include audio or sound from a primary source 106. The primary source 106 may include a foreground speaker or other intended source of audio. For simplicity, the primary source 106 may be described as a speaker and the primary source audio may be described as a speech signal, however, the primary source 106 may include sound emissions other than just a speaker. The system determines audio from the primary source 106 by identifying all other audio from the audio input signal 104. The other audio may include other speakers 112, such as background or unintended speakers. Likewise, background noise 108 and other sounds 110, such as perturbations may also be part of the audio input signal 104. As described, background audio, background sound, or background noise may be used to describe and include any audio (including other speakers/sounds) other than audio from the primary source 106.

Figure 2:
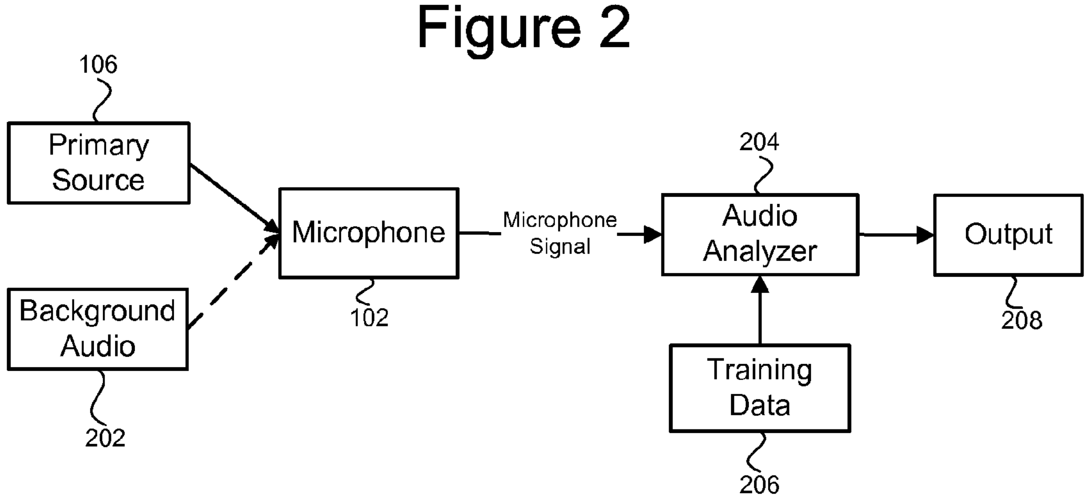
FIG. 2 is a system for analyzing audio.
Figure 5:
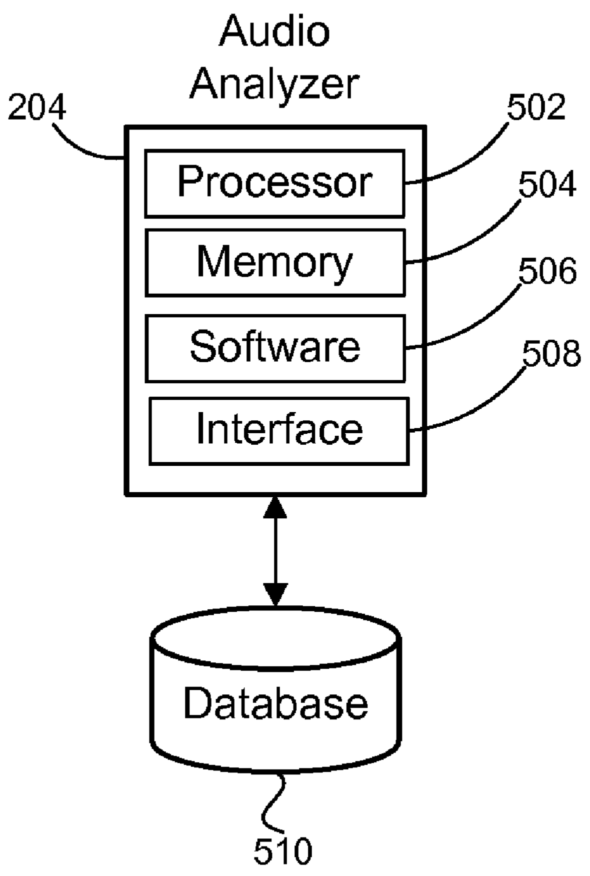
FIG. 5 is an exemplary audio analyzer.

FIG. 2 is a system for analyzing audio. The microphone 102 receives audio from the primary source 106, as well as background audio 202. The microphone 102 generates a microphone signal from the received audio. The microphone signal may include speech and no speech portions. In both signal portions background audio, such as perturbations, may be present. The microphone signal is passed to an audio analyzer 204. The audio analyzer 204 may be a computing device that receives and analyzes audio signals as shown in FIG. 5. As described below, the audio analyzer 204 may analyze the microphone signal and distinguish audio from the primary source 106 from the background audio 202. This distinction may be used to produce the output 208.

Figure 3:
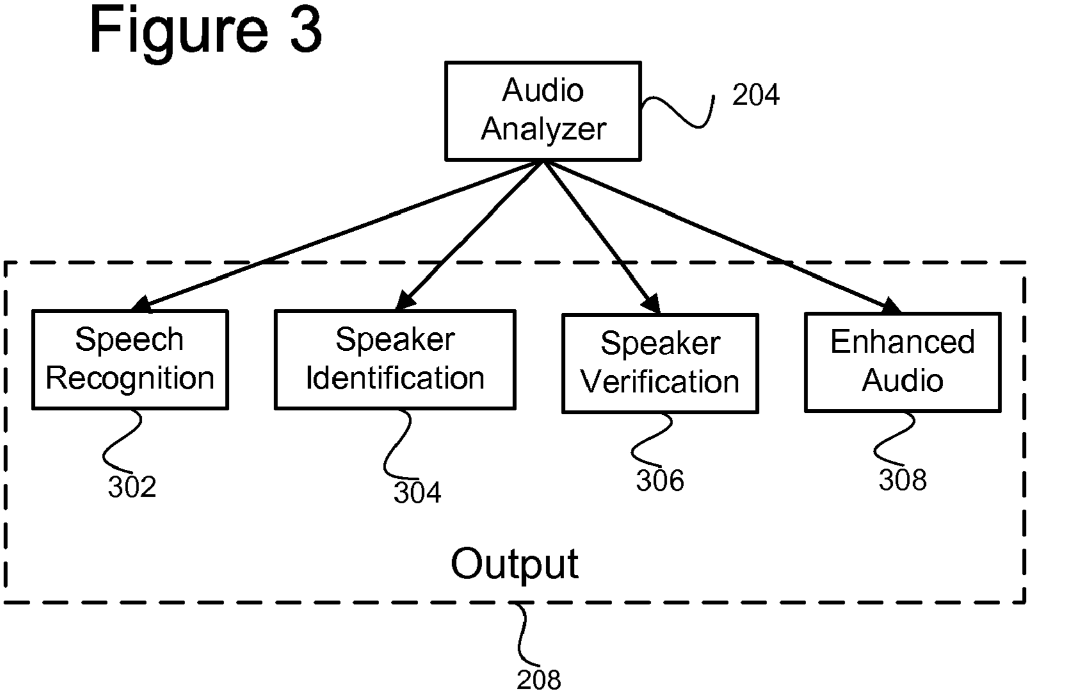
FIG. 3 is an audio analysis system.

FIG. 3 is an audio analysis system illustrating the output 208 from the audio analyzer 204. The output 208 may include speech recognition 302, speaker identification 304, speaker verification 306, and/or enhanced audio 308. Speech recognition 302 may include identifying the words that are spoken into the microphone. Speaker identification 304 may include determining the identity of a speaker based on the speech received by the microphone. Likewise, speaker verification 306 may include determining the identity of a speaker for verification. In some systems, an additional self-learning speaker identification system may enable the unsupervised stochastic modeling of unknown speakers and the recognition of known speakers, such as is described in commonly assigned U.S. patent application Ser. No. 12/249,089, entitled "Speaker Recognition System," filed on Oct. 10, 2008, the entire disclosure of which is incorporated by reference.

The distinction determined by the audio analyzer 204 may also be used for generating enhanced audio 308. In particular, the audio/speech input into the microphone may include background audio, and after that background audio is distinguished, it may be removed or suppressed to improve the audio from the primary source. Alternatively, after identifying segments of an audio signal from the primary source, those segments may be attenuated by noise reduction filtering means, such as a Wiener filter or a spectral subtraction filter. Conversely, segments of the audio signal that are background audio may be dampened for enhancing the audio.

Figure 4:
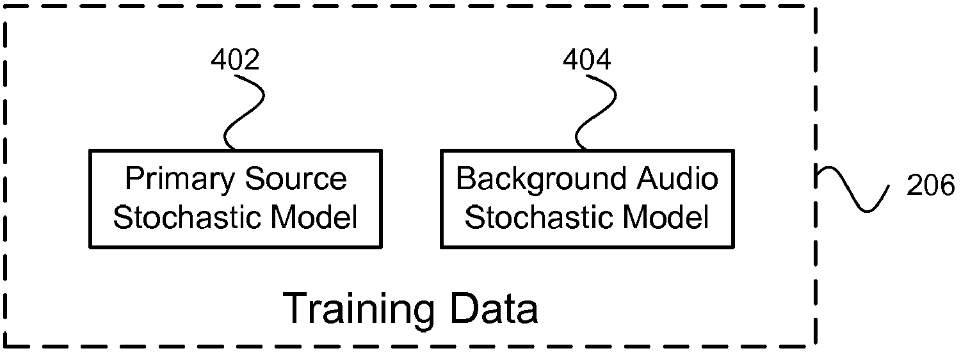
FIG. 4 is exemplary training data.

The audio analyzer 204 may utilize training data 206 for distinguishing audio. FIG. 4 is exemplary training data 206. The training data 206 may include a primary source stochastic model 402 and a background audio stochastic model 404. As described below with respect to FIG. 7, a stochastic model may characterize the audio. The primary source stochastic model 402 characterizes the audio from the primary source and the background audio stochastic model 404 characterizes the background audio. A stochastic model may include a probability analysis in which multiple results may occur because of the presence of a random element. Even if an initial condition is known, the stochastic model may identify multiple possibilities in which some are more probable than others. An audio signal, such as a speech signal, may be modeled with a stochastic model because it fluctuates over time.

The training may be performed off-line on the basis of feature vectors from the primary source and from background audio, respectively. Characteristics or feature vectors may include feature parameters, such as the frequencies and amplitudes of signals, energy levels per frequency range, formants, the pitch, the mean power and the spectral envelope, etc., or other characteristics for received speech signals. The feature vectors may comprise cepstral vectors.

In one example, a stochastic model will be associated with each of a plurality of potential speakers. The stochastic models for each speaker may be used for improving or enhancing the speech from the speaker. Stochastic models for both the utterances of a foreground speaker and the background noise may produce a more reliable segmentation of portions of the microphone signal that contains speech and portions that contain significant speech pauses (no speech) as further discussed below. Significant speech pauses may occur before and after a foreground speaker's utterance. The utterance itself may include short pauses between individual words. These short pauses may be considered part of speech present in the microphone signal. The segmentation that identifies the beginning and end of the foreground speaker's utterance may be utilized for distinguishing the speaker's utterance from background noise.

A stochastic model for the background audio 202 may comprise a stochastic model for diffuse non-verbal background noise 108 and verbal background noise due to background speaker 112. A stochastic model for the primary source 106, which may be a foreground speaker whose utterance corresponds to the wanted signal. The foreground may be an area close (e.g., several meters) to the microphone 102 used to obtain the microphone signal. Even if a second speaker 112 is as close to the microphone 102 as the foreground speaker, the foreground speaker's utterances may be identified through the use of different stochastic models for each speaker.

FIG. 5 is an exemplary audio analyzer 204. The audio analyzer 204 may include a processor 502, memory 504, software 506 and an interface 508. The interface 508 may include a user interface that allows a user to interact with any of the components of the audio analyzer 204. For example, a user may modify or provide the stochastic models that are used by the audio analyzer 204 to distinguish audio from the primary source. In one example, data that is used for determining stochastic models, as well as parameters of those models may be stored in a database 510. In some systems, the database 510 may be a part of or the same as the memory 504.

The processor 502 in the audio analyzer 204 may include a central processing unit (CPU), a graphics processing unit (GPU), a digital signal processor (DSP) or other type of processing device. The processor 502 may be a component in any one of a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may operate in conjunction with a software program, such as code generated manually (i.e., programmed).

The processor 502 may communicate with a local memory 504, or a remote memory 504. The interface 508 and/or the software 506 may be stored in the memory 504. The memory 504 may include computer readable storage media such as various types of volatile and non-volatile storage media, including to random access memory, read-only memory, programmable read-only memory, electrically programmable read-only memory, electrically erasable read-only memory, flash memory, magnetic tape or disk, optical media and the like. In one system, the memory 504 includes a random access memory for the processor 502. In alternative systems, the memory 504 is separate from the processor 502, such as a cache memory of a processor, the system memory, or other memory. The memory 504 may be an external storage device, such as the database 510, for storing audio data, model parameters, model data, etc. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502.

The functions, acts or tasks illustrated in the figures or described here may be processed by the processor executing the instructions stored in the memory 504. The functions, acts or tasks are independent of the particular type of instruction set, storage media, processor or processing strategy and may be performed by software, hardware, integrated circuits, firm-ware, micro-code and the like, operating alone or in combination. Processing strategies may include multiprocessing, multitasking, or parallel processing. The processor 502 may execute the software 506 that includes instructions that analyze audio signals.

The interface 508 may be a user input device or a display. The interface 508 may include a keyboard, keypad or a cursor control device, such as a mouse, or a joystick, touch screen display, remote control or any other device operative to interact with the audio analyzer 204. The interface 508 may include a display that communicates with the processor 502 and configured to display an output from the processor 502. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 502, or as an interface with the software 506 for providing input parameters. In particular, the interface 508 may allow a user to interact with the audio analyzer 204 to generate and modify models for audio data received from the microphone 102.

Figure 6:
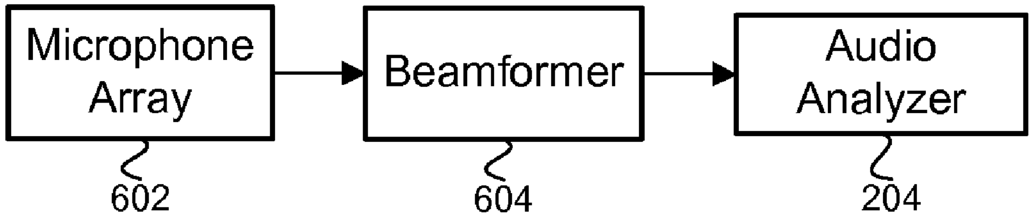
FIG. 6 is another audio analysis system.

FIG. 6 is another audio analysis system. A microphone array 602 may replace the microphone 102 discussed above. In particular, the microphone array 602 may comprise a plurality of microphones 102 that each measure and/or receive audio signals. A beamformer 604 may be coupled with the microphone array 602 for improving the measured audio. The beamformer 604 may be utilized for steering the microphone array 602 to the direction of the primary source 106 or foreground speaker. The microphone signal from the microphone array 602 may represent a beamformed microphone signal that may be analyzed by the audio analyzer 204.

The beamforming may be performed by a "General Sidelobe Canceller" (GSC). The GSC may include two signal processing paths: a first (or lower) adaptive path with a blocking matrix and an adaptive noise cancelling means and a second (or upper) non-adaptive path with a fixed beamformer. The fixed beamformer may improve the signals pre-processed, e.g., by a means for time delay compensation using a fixed beam pattern. Adaptive processing methods may be characterized by an adaptation of processing parameters such as filter coefficients during operation of the system. The lower signal processing path of the GSC may be optimized to generate noise reference signals used to subtract the residual noise of the output signal of the fixed beamformer. The lower signal processing means may comprise a blocking matrix that may be used to generate noise reference signals from the microphone signals. Based on these interfering signals, the residual noise of the output signal of the fixed beamformer may be subtracted applying some adaptive noise cancelling means that employs adaptive filters.

The distinction or discrimination of the primary source 106 audio (such as a foreground speaker) from the background audio 202 may include stochastic models and assigning scores to feature vectors from the microphone signal as discussed below. The score may be determined by assigning the feature vector to a class of the stochastic models. If the score for assignment to a class of the primary source stochastic speaker model exceeds a predetermined limit, the associated signal portion may be determined to be from the primary source. In particular, a score may be assigned to feature vectors extracted from the microphone signal for each class of the stochastic models, respectively. Scoring of the extracted feature vectors may provide a method for determining signal portions of the microphone signal that include audio from the primary source.

Figure 7:
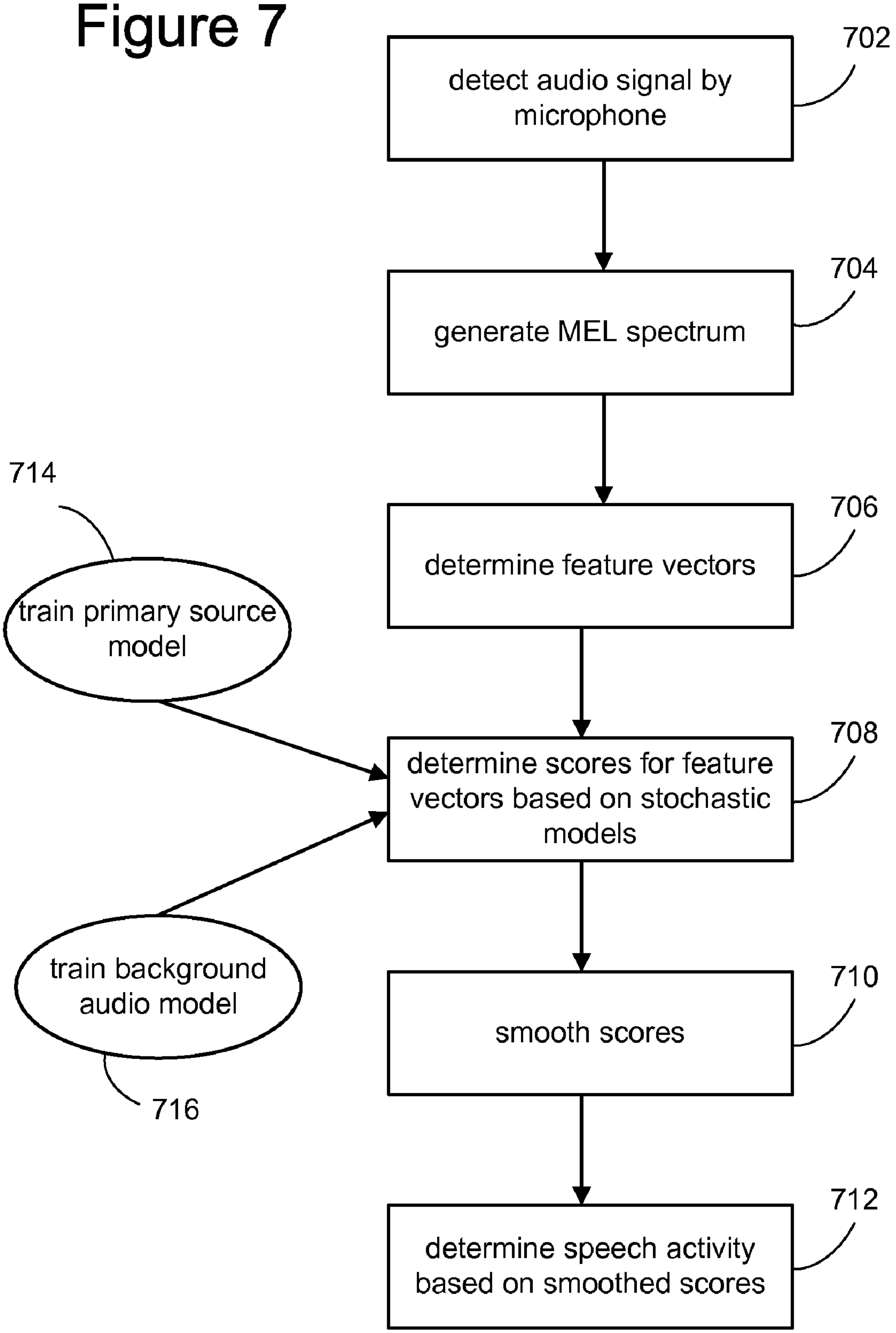
FIG. 7 is a process for distinguishing speech in a microphone signal.

FIG. 7 is an exemplary process for distinguishing speech in a microphone signal. An audio signal is detected by a microphone in block 702. The microphone signal may include a verbal utterance by a speaker positioned near the microphone and may also include background audio. The background audio may include diffuse non-verbal noise and babble noise, as well as utterances by other speakers. The other speakers may be positioned away from the microphone or further away than the foreground speaker. The microphone signal may be obtained by one or more microphones, in particular, a microphone array steered to the direction of the foreground speaker. In the case of a microphone array, the microphone signal obtained in block 702 may be a beamformed signal as discussed with respect to FIG. 6.

From the microphone signal obtained in block 702 of FIG. 1 one or more characteristic feature vectors may be extracted from the audio signal. According to one example, Mel-frequency cepstral coefficients (MFCCs) may be determined. In particular, the digitized microphone signal y(n) (where n is the discrete time index due to the finite sampling rate) is subject to a Short Time Fourier Transformation employing a window function, e.g., the Hann window, in order to obtain a spectrogram. The spectrogram represents the signal values in the time domain divided into overlapping frames, weighted by the window function and transformed into the frequency domain. The spectrogram may be processed for noise reduction by the method of spectral subtraction, i.e., by subtracting an estimate for the noise spectrum from the spectrogram of the microphone signal, as known in the art. The spectrogram may be supplied to a Mel filter bank modeling the MEL frequency sensitivity of the human ear and the output of the Mel filter bank is logarithmized to obtain the cepstrum in block 704 for the microphone signal y(n). The obtained spectrum may show a strong correlation in the different bands due to the pitch of the speech contribution to the microphone signal y(n) and the associated harmonics. Therefore, a Discrete Cosine Transformation applied to the cepstrum may obtain the feature vectors x as in block 706. The feature vectors may comprise feature parameters, such as the formants, the pitch, the mean power and the spectral envelope.

At least one stochastic primary source model and at least one stochastic model for background audio are used for determining speech parts in the microphone signal. These models may be trained off-line in blocks 714, 716. The training may occur before the signal processing is performed. Training may include preparing sound samples that can be analyzed for feature parameters as described above. For example, speech samples may be taken from a plurality of speakers positioned close to a microphone used for taking the samples in order to train a stochastic speaker model.

In some systems, Hidden Markov Models (HMM) may be used. HMM may be characterized by a sequence of states each of which has a well-defined transition probability. If speech recognition is performed by HMM, in order to recognize a spoken word, a likely sequence of states through the HMM may be computed. This calculation may be performed by the Viterbi algorithm, which may iteratively determine the likely path through the associated trellis.

Alternatively, in some systems, Gaussian Mixture Models (GMM) may be used. GMM may model transition probabilities and may improve the modeling of feature vectors that are expected to be statistically independent from one another. A GMM may include N classes each consisting of a multivariate Gauss distribution $\Gamma\{x|\mu, \Sigma\}$ with the average $\mu$ and the covariance matrix $\Sigma$. A probability density of a GMM may be given by $$p(x|\lambda) = \sum_{i=1}^{N} w_i \Gamma\{x|\mu_i, \Sigma_i\}$$

with the a priori probabilities $p(i)=w_i$ (weights), with $$\sum_{i=1}^{N} w_i = 1$$

and the parameter set $\lambda=\{w_1, \ldots, w_N, \mu_1, \ldots, \mu_N, \Sigma_1, \ldots, \Sigma_N\}$ of a GMM.

For the GMM training of both the stochastic primary source model in block 714 and the stochastic background audio model in block 716 the Expectation Maximization (EM) algorithm or the K-means algorithm may be used. Starting from an arbitrary initial parameter set comprising, e.g., equally Gaussian distributed weights $w_i$ and arbitrary feature vectors as the means pi with covariant unit matrices, feature vectors of training samples may be assigned to classes of the initial models by means of the EM algorithm, i.e. by means of a posteriori probabilities, or the K-means algorithm according to the least Euclidian distance. The iterative training of the stochastic models may include the parameter sets of the models are estimated and adopted for the new models until a predetermined abort criterion is fulfilled. In some systems, one or more speaker-independent, Universal Speaker Model (USM), or speaker-dependent models may be used. The USM may serve as a template for speaker-dependent models generated by an appropriate adaptation as discussed below.

One speaker-independent stochastic speaker model for the primary source may be characterized by $\lambda_{USM}$ and one stochastic model for the background audio (the Diffuse Background Model (DBM)) may characterized by $\lambda_{DBM}$. A total model including the parameter set of both models may be formed $\lambda=\{\lambda_{USM}, \lambda_{DBM}\}$. The total model may be used to determine scores SUSM, as in block 708, for each of the feature vectors $x_t$ extracted in block 706 from the MEL cepstrum. In this context, t denotes the discrete time index. In some systems, the scores may be calculated by the a posteriori probabilities representing the probability for the assignment of a given feature vector $x_t$ at a particular time to a particular one of the classes of the total model for given parameters $\lambda$, where indices i and j denote the class indices of the USM and DBM, respectively:

$$p(i|x_t, \lambda) = \frac{w_{USM,i}\Gamma\{x_t \mid \mu_{USM,i}, \Sigma_{USM,i}\}}{\sum_i w_{USM,i}\Gamma\{x_t \mid \mu_{USM,i}, \Sigma_{USM,i}\} + \sum_j w_{DBM,j}\Gamma\{x_t \mid \mu_{DBM,j}, \Sigma_{DBM,j}\}}$$

in the form of $$S_{USM}(x_t) = \sum_i p(i \mid x_t, \lambda),$$

i.e.

$$S_{USM}(x_t) = \frac{\sum_i w_{USM,i}\Gamma\{x_t \mid \mu_{USM,i}, \Sigma_{USM,i}\}}{\sum_i w_{USM,i}\Gamma\{x_t \mid \mu_{USM,i}, \Sigma_{USM,i}\} + \sum_j w_{DBM,j}\Gamma\{x_t \mid \mu_{DBM,j}, \Sigma_{DBM,j}\}}.$$

With the likelihood function $$p(x_t, \lambda) = \sum_i w_i \Gamma\{x_t \mid \mu_i, \Sigma_i\},$$

the above formula may be re-written as $$S_{USM}(x_t) = \frac{1}{1 + \exp(\ln p(x_t \mid \lambda_{DBM}) - \ln p(x_t \mid \lambda_{USM}))}.$$

This sigmoid function may be modified by parameters $\alpha$, $\beta$ and $\gamma$ as:

$$\tilde{S}_{USM}(x_t) = \frac{1}{1 + \exp(\alpha \ln p(x_t \mid \lambda_{DBM}) - \beta \ln p(x_t \mid \lambda_{USM}) + \gamma))};$$

$$0 \le \tilde{S}_{USM}(x_t) \le 1$$

in order to weight scores in a particular range (damp or raise scores) or to compensate for some biasing. Such a modification (smoothing) may be carried out for each frame to avoid a time delay and for real time processing as in block 710. In some systems, the scoring may occur only for those classes that show a likelihood for exceeding a suitable threshold for a respective frame.

The smoothing in block 710 may be performed to avoid outliers and strong temporal variations of the sigmoid. The smoothing may be performed by an appropriate digital filter, e.g., a Hann window filter function. In some systems, the time history of the above described score may be divided into very small overlapping time windows and an average value may be determined adaptively, along with a maximum value and a minimum value of the scores. A measure for the variations in a considered time interval (represented by multiple overlapping time windows) may be given by the difference of maximum to minimum values. This difference may be subsequently subtracted (after some appropriate normalization in some systems) from the average value to obtain a smoothed score for the primary source as in block 710.

Based on the scores (with or without the smoothing in block 710) primary source audio from the microphone signal may be determined in block 712. Depending on whether the determined scores exceed or fall below a predetermined threshold L the audio in question may be from the primary source or from background audio. In some systems, when the audio is from the primary source, such as a speaker, the score for that audio signal exceeds the threshold L. For example, a binary mapping may be employed for the detection of primary source audio activity $$FSAD(x_t) = \begin{cases} 1, & \text{if } \tilde{S}_{USM}(x_t) \geq L \\ 0, & \text{else.} \end{cases}$$

Short speech pauses between detected speech contributions may be considered part of the speech from the primary source. A short pause between two words of a command uttered by the foreground speaker, e.g., "Call XY", "Delete z", etc., may be passed by the segmentation between speech and no speech.

Some systems may relate to a singular stochastic primary source model and a singular stochastic model for background audio. In alternative systems, a plurality of models may be employed, respectively. In some systems, the plurality of stochastic models for the background audio may be used to classify the background audio present in the microphone signal. K models for different types of background audio (perturbances) may be trained in combination with a singular primary source speaker model $\lambda=\{\lambda_{USM}, \lambda_1, \ldots, \lambda_K\}$. Accordingly, the above formulae may read $$S_{USM}(x_t) = \frac{\sum_i w_{USM,i}\Gamma\{x_t \mid \mu_{USM,i}, \Sigma_{USM,i}\}}{\sum_i w_{USM,i}\Gamma\{x_t \mid \mu_{USM,i}, \Sigma_{USM,i}\} + \sum_{k=1}^{K}\sum_j w_{k,j}\Gamma\{x_t \mid \mu_{k,j}, \Sigma_{k,j}\}}$$

and $$S_{USM}(x_t) = \frac{1}{1 + \exp\left(\ln\left(\sum_k p(x_t \mid \lambda_k)\right) - \ln p(x_t \mid \lambda_{USM})\right)}.$$

The characteristics of the sigmoid may be controlled by parameters, namely, $\alpha$, $\beta$ and $\gamma$ as described above and $\delta_k$, k=1, . . . , K for weighting the individual models for perturbations characterized by $\lambda k$ $$\tilde{S}_{USM}(x_t) = \frac{1}{1 + \exp\left(\alpha\ln\left(\sum_k \delta_k p(x_t \mid \lambda_k)\right) - \beta\ln p(x_t \mid \lambda_{USM}) + \gamma\right)}.$$

In some systems, speaker-dependent stochastic speaker models may be used additionally or in place of the above-mentioned USM in order to perform speaker identification or speaker verification. Therefore, each of the USM's is adapted to a particular foreground speaker. Exemplary methods for speaker adaptation may include the Maximum Likelihood Linear Regression (MLLR) and the Maximum A Priori (MAP) methods. The latter may represent a modified version of the EM algorithm. According to the MAP method, starting from a USM the a posteriori probability $$p(i \mid x_t, \lambda) = \frac{w_i\Gamma\{x_t \mid \mu_i, \Sigma_i\}}{\sum_{i=1}^{N} w_i\Gamma\{x_t \mid \mu_i, \Sigma_i\}}$$

may be calculated. According to the a posteriori probability, the extracted feature vectors may be assigned to classes for modifying the model. The relative frequency of occurrence $\hat{w}$ of the feature vectors in the classes that they are assigned to may be calculated as well as the means $\hat{\mu}$ and covariance matrices $\hat{\Sigma}$. These parameters may be used to update the GMM parameters. Adaptation of only the means $\mu_i$ and the weights $w_i$ may be utilized to avoid problems in estimating the covariance matrices. With the total number of feature vectors assigned to a class i, $$n_i = \sum_{t=1}^{T} p(i \mid x_t, \lambda),$$

one obtains $$\hat{w}_i = \frac{n_i}{T}$$

and $$\hat{\mu}_i = \frac{1}{n_i}\sum_{t=1}^{T} p(i \mid x_t, \lambda)x_t.$$

The new GMM parameters $\overline{w}_i$ and $\overline{\mu}_i$ may be obtained from the previous ones (according to the previous adaptation) and the above $\hat{w}_i$ and $\hat{\mu}_i$. This may be achieved by employing a weighting function such that classes with less adaptation values may be adapted slower than classes to which a greater number of feature vectors are assigned:

$$\overline{w}_i = \frac{w_i(1-\alpha_i) + \hat{w}_i\alpha_i}{\sum_{i=1}^{N}(w_i(1-\alpha_i) + \hat{w}_i a_i)}$$

$$\overline{\mu}_i = \mu_i(1-\alpha_i) + \hat{\mu}_i\alpha_i$$

with predetermined positive real numbers $$\alpha_i = \frac{n_i}{n_i + \text{const.}}$$

that are smaller than 1.

The system and process described may be encoded in a signal bearing medium, a computer readable medium such as a memory, programmed within a device such as one or more integrated circuits, one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for enhancing a microphone signal using a processor, the method comprising:

- receiving the microphone signal comprising audio from a primary audio source and from background audio;
- providing at least one stochastic speaker model for the primary audio source, the at least one stochastic speaker model comprising a first Gaussian mixture model;
- providing at least one stochastic model for the background audio, the at least one stochastic model for the background audio comprising a second Gaussian mixture model; and
- using the processor to determine portions of the microphone signal that include audio from the primary audio source based on the at least one stochastic speaker models for the primary audio source and the one stochastic model for the background audio, where the at least one stochastic model for background audio comprises a stochastic model for diffuse non-verbal background noise and verbal background noise due to at least one background speaker.

2. The method according to claim 1 where using the processor to determine portions of the microphone signal further comprises:

- using the processor to extract at least one feature vector from the microphone signal;
- using the processor to assign a score to each of the at least one feature vectors indicating a relation of the feature vector to the Gaussian mixture models; and
- using the processor to use the assigned score to determine the signal portions of the microphone signal that include audio from the primary audio source.

3. The method according to claim 2 where the portions of the microphone signal that include audio from the primary audio source are determined when the assigned score from the at least one feature vector exceeds a predetermined threshold.

4. The method according to claim 2 where the first and the second Gaussian mixture models are generated by a K-means cluster algorithm or an expectation maximization algorithm, and further where the score assigned to the at least one feature vector is determined by an a posteriori probability for the feature vector to match at least one of a first set of classes from the first Gaussian mixture model.

5. The method according to claim 1 where the primary audio source comprises a foreground speaker.

6. The method according to claim 5 further comprising using the processor to identify or verify the foreground speaker from the determined portions of the speech signal that include audio from the primary audio source.

7. The method according to claim 1 where the background noise comprises perturbations, a background speaker, and/or babble noise.

8. The method according to claim 1 where the microphone signal is generated from a microphone array and the microphone signal from the microphone array is processed by a beamformer.

9. In a non-transitory computer readable storage medium having stored therein data representing instructions executable by a programmed processor for distinguishing audio from a primary source, the storage medium comprising instructions operative for:

- receiving an audio signal that comprises audio from the primary source and background audio;
- providing a stochastic model for the audio from the primary source;
- providing a stochastic model for the background audio where the stochastic model for background audio comprises a stochastic model for diffuse non-verbal background noise and verbal background noise due to at least one background speaker;
- distinguishing the primary source audio from the background audio in the audio signal, where the distinguishing comprises:
- identifying a feature vector from the audio signal;
- assigning a score for the feature vector based on the stochastic models for the primary source and for the background audio; and
- determining that a portion of the audio signal is from the primary source when the score for the feature vector exceeds a threshold.

10. The computer readable storage medium of claim 9 where the audio signal comprises a microphone signal from a microphone that receives audio.

11. The computer readable storage medium of claim 9 where the feature vector comprises at least one feature parameter, including formats, pitch, power, energy, or spectral envelope.

12. The computer readable storage medium of claim 10 where the stochastic model for the primary source comprises a first Gaussian mixture model comprising a first set of classes and the stochastic model for the background noise comprises a second Gaussian mixture model comprising a second set of classes.

13. The computer readable storage medium of claim 12 where the first and the second Gaussian mixture models are generated by a K-means cluster algorithm or an expectation maximization algorithm.

14. The computer readable storage medium of claim 12 where the score assigned to the feature vector is determined by an a posteriori probability for the feature vector to match at least one of the first set of classes from the first Gaussian mixture model.

15. The computer readable storage medium of claim 14 where the score assigned to the feature vector is smoothed in time and signal portions of the microphone signal are determined to include speech from the primary source when the smoothed score assigned to the feature vector exceeds the threshold.

16. A system for distinguishing a microphone signal comprising:

a microphone that receives an audio signal and generates the microphone signal, where the audio signal comprises audio from a primary source and background audio;

a database that stores at least one stochastic model for the primary source and stores at least one stochastic model for the background audio where the stochastic model for background audio comprises a stochastic model for diffuse non-verbal background noise and verbal background noise due to at least one background speaker; and an audio analyzer, coupled with the database and the microphone, that processes the microphone signal, the processing including identifying portions of the microphone signal from the primary source based on the at least one stochastic models for the primary source and the at least one stochastic model for the background audio.

17. The system of claim 16 where the primary source comprises a foreground speaker and the primary source audio comprises a speech signal.

18. The system of claim 16 where the database stores training data for the at least one stochastic model for the primary source and stores training data for the at least one stochastic model for the background audio.

19. The system of claim 16 where the microphone comprises a microphone array.

20. The system of claim 19 further comprising a beamformer coupled with the microphone array for beamforming the microphone signal, where the audio analyzer processes the beamformed microphone signal.

21. The system of claim 20 where the beamformer comprises a General Sidelobe Canceller, and is configured to beamform the microphone signals of the individual microphones of the microphone array to obtain the beamformed microphone signal.

* * * * *